(12) United States Patent
Morikage et al.

(10) Patent No.: US 7,325,717 B2
(45) Date of Patent: Feb. 5, 2008

(54) WELDING MATERIAL AND A METHOD OF PRODUCING WELDED JOINT

(75) Inventors: Yasushi Morikage, Chiba (JP); Takahiro Kubo, Chiba (JP); Koich Yasuda, Chiba (JP); Keniti Amano, Kurashiki (JP); Kazuo Hiraoka, Tsukuba (JP); Akihiko Ohta, Tsukuba (JP); Chiaki Shiga, Tsukuba (JP)

(73) Assignee: National Institute for Materials Science, Ibaraki (JP)

( * ) Notice: Subject to any disclaimer, the term of this patent is extended or adjusted under 35 U.S.C. 154(b) by 0 days.

(21) Appl. No.: 11/168,324

(22) Filed: Jun. 29, 2005

(65) Prior Publication Data

US 2005/0252579 A1 Nov. 17, 2005

Related U.S. Application Data

(60) Division of application No. 10/428,919, filed on May 5, 2003, now abandoned, which is a continuation of application No. 09/737,578, filed on Dec. 18, 2000, now abandoned.

(30) Foreign Application Priority Data

Dec. 17, 1999 (JP) .................. 11-359822
Dec. 28, 1999 (JP) .................. 11-372279

(51) Int. Cl.
*B23K 20/16* (2006.01)
*B23K 35/24* (2006.01)
*B23K 9/00* (2006.01)

(52) U.S. Cl. .................. 228/262.4; 219/136

(58) Field of Classification Search .................. None
See application file for complete search history.

(56) References Cited

U.S. PATENT DOCUMENTS

| | | | |
|---|---|---|---|
| 3,596,053 A | | 7/1971 | Kaneda et al. |
| 3,690,869 A | * | 9/1972 | Potak et al. .................. 420/41 |
| 3,700,851 A | * | 10/1972 | Bjorkroth .............. 219/137 R |
| 3,740,525 A | * | 6/1973 | Baumel .................. 219/137 R |
| 3,767,388 A | | 10/1973 | Asakura et al. |
| 3,836,748 A | * | 9/1974 | Terai et al. ............. 219/137 R |
| 5,296,677 A | * | 3/1994 | Takahashi et al. ..... 219/146.41 |
| 5,361,968 A | | 11/1994 | Tanaka et al. |
| 6,059,177 A | * | 5/2000 | Watanabe et al. ...... 228/262.41 |
| 6,290,905 B1 | * | 9/2001 | Watanabe et al. ............. 420/43 |
| 6,620,261 B2 | * | 9/2003 | Kim et al. .................... 148/24 |
| 6,883,701 B2 | * | 4/2005 | Rabinkin et al. ........... 228/183 |

FOREIGN PATENT DOCUMENTS

| | | |
|---|---|---|
| JP | 9-253860 | 9/1997 |
| JP | 11-138290 | 5/1999 |
| JP | 11239874 | 7/1999 |

\* cited by examiner

*Primary Examiner*—Kiley Stoner
(74) *Attorney, Agent, or Firm*—Young & Thompson

(57) ABSTRACT

In the present invention, an iron based alloy which contains by mass %: 0.20% or less of C; 6.0 to 16.0% of Cr; 6.0 to 16.0% of Ni and whose martensitic transformation starting temperature (Ms point temperature) is in the range of 0-170° C., inclusive of 0° C. and exclusive of 170° C., is used as a welding material. With respect to a weld metal, the weld metal has a iron alloy composition which contains by mass %: 0.20% or less of C; 3.0 to 13.0% of Cr; 3.0 to 13.0% of Ni and whose martensitic transformation starting temperature (Ms point temperature) is in the range of 50-360° C., inclusive of both 50° C. and 360° C.

4 Claims, 2 Drawing Sheets

WELDING MATERIAL AND A METHOD OF PRODUCING WELDED JOINT

CROSS REFERENCE TO RELATED APPLICATIONS

This application is a division of application Ser. No. 10/428,919, filed on May 5, 2003 now abandoned, the entire contents of which are hereby incorporated by reference.

TECHNICAL FIELD

The present invention relates to a welding material which is preferably used for welding of large-scale steel structures such as ships, bridges, tanks, construction machines and the like. The present invention specifically relates to improving weld crack-resistance properties and fatigue-resistance properties of a welding joint.

BACKGROUND ART

In large-scale steel structures such ships, marine structures, penstock, bridges, tanks, construction machines and the like, there has been a demand for enhancing strength of steel used therein so as to reduce the weight of the structure as a whole. In the steel material used in such steel structures, what is called "low alloy steel", which contains less than 10 mass % or more preferably less than 5.0 mass % of alloy elements (Cr, Ni, Mo and the like),is mainly used. The strength of low alloy steel is generally in the range of 290 to 1180 MPa.

Due to the aforementioned demand for a steel material having higher strength, a low alloy steel material having high strength is preferably used. However, a low alloy steel material of such a type quite often experiences occurrence of cracking at a low temperature during welding. Such low-temperature cracking at welded joints of the high strength steel material is mainly caused by hydrogen which has been dissolved into the weld metal during the welding process. During the cooling the hydrogen diffuses and concentrates especially on the stress-concentrating portions such as the stop-end portion and the root portion which have been hardened by the welding heat, thereby generating cracks therein. It is well known that, the more such diffusive hydrogen is dissolved in the weld metal and the higher the stresses are, the more likely the low-temperature weld-cracking is to occur. It is also well known that, the larger the amount of the diffusive hydrogen is, the smaller stress is required to generate the low-temperature weld-cracking. The limit curve of the low-temperature weld-cracking generation is schematically shown in FIG. 2.

In order to prevent such low-temperature cracking during welding the following methods have been conventionally taken:
1) Pre-heating at the time of welding;
2) Appropriate post-heating immediately after welding;
3) Use of low hydrogen-type welding materials;
   and with respect to the steel material as a material to be welded,
4) Use of a steel material in which carbon or the like is reduced to the low-carbon equivalent so as to reduce the weld-hardenability properties;
5) Use of a steel material in which $P_{CM}$ value is reduced so as to reduce the low-temperature weld-cracking sensitivities.

However, pre-heating and/or post-heating during welding is extremely painstaking and time-consuming work, which inevitably results in the higher cost for welding operation and lower efficiency of welding operation. In addition, in the case of high-strength steel of 780 MPa grade or higher, such high-tensile strength steel contains relatively large amounts of alloy elements which are added for ensuring higher strength, and thus essentially requires pre-heating during welding in terms of preventing the low-temperature cracking during welding, regardless of the use of low hydrogen type-welding materials.

In order to solve the aforementioned problems, JP-A 9-253860 Laid-Open, for example, proposes a welding method in which high-tensile strength steel of 760-980 $N/mm^2$ grade is TIG welded by using a solid wire containing 7.5-12.0 mass % of Ni and 2 wt. ppm or less of H, at a wire supplying rate of 5 to 40 g/min, with the Ms point temperature temperature of the whole weld metals of 400° C. or lower. According to this welding method, although the high-tensile strength steel of 760 to 980 $N/mm^2$ grade which has extra-thickness (more than 50 mm) is used, generation of weld-cracking at the room temperature can be prevented.

In addition, JP-A 11-138290 Laid-Open discloses a welding method in which a weld metal generated by welding experiences martensitic transformation during the cooling process after the welding so as to reach a state in which the weld metal is expanded, at the room temperature, as compared with the state thereof when the martensitic transformation started. The reference describes that an iron alloy whose martensitic transformation starting temperature is in the range of 170 to 250° C. (inclusive of 170° C. and exclusive of 250° C.) is used as the welding material.

However, the technique disclosed in JP-A 9-253860 Laid-Open is limited to the TIG welding. That is, there is a problem that, if other welding methods in which the amount of diffusive hydrogen is relatively large (2 wt. ppm or more) are employed in the technique, pre-heating will still be required in order to prevent weld-cracking.

In addition, in the technique described in JP-A 11-138290 Laid-Open, there arises what is called the "over-matching" problem in which the strength of the weld metal becomes larger than the strength of the welded materials.

SUMMARY OF THE INVENTION

An object of the present invention is to solve the aforementioned problems of the prior art and to propose a welding material and a method of producing a welded joint, in which low-temperature cracking of a welded joint of high-tensile strength on steel of 490-1180 MPa can be prevented without performing pre-heating, the fatigue strength of the welded joint can be enhanced, and the strength of the weld metal can be adjusted at an appropriate value. It is also an object of the present invention to propose a welded joint in which low temperature cracking during welding can be prevented.

The inventors of the present invention experimentally welded high-tensile strength steel of 490-1180 MPa grade by using various types of welding materials, and assiduously studied the low-temperature cracking, the fatigue strength of a welded joint, factors which affect the strength of the weld metal, and a method of preventing the low-temperature cracking.

As a result, the inventors of the present invention discovered that, in order to enhance the fatigue strength of the welded joint, it is very important that the weld metal has a composition exhibiting a temperature-elongation curve (a thermal expansion curve) in which the weld metal experiences martensitic transformation during the cooling process after the welding and the weld metal reaches, after being cooled to the room temperature, a state in which the weld metal is expanded as compared with the state thereof when the martensitic transformation started.

In addition, the inventors of the present invention discovered that, due to the weld metal experiencing the martensitic transformation during the cooling process after welding and reaching a state, at the room temperature, in which the weld metal is expanded as compared with the state thereof when the martensitic transformation started, the tensile residual stress generated in the weld metal during the cooling process can be alleviated or converted to a compressive residual stress. Further, the inventors discovered that, due to the same mechanism, the tensile stress is prevented from concentrating on the end portion or the root portion which is hardened by the welding heat, the fatigue strength of the welded joint portion is enhanced, and the diffusive hydrogen is prevented from diffusing and concentrating to the end portion or the root portion, thereby allowing preventing of the low-temperature cracking without pre-heating.

Yet further, as a result of studying the transformation characteristics of the weld metal which are most suitable for improving the crack-resistance properties, the present inventors discovered that the weld-cracking rate becomes zero when the amount of linear expansion, in the temperature range from the temperature, at which elongation turns into expansion due to the martensitic transformation (i.e., the temperature observed immediately after the starting of martensitic transformation in the cooling process at which temperature the elongation is smallest), to 50° C. in a temperature-elongation curve (a thermal expansion curve), is $2 \times 10^{-3}$ to $8 \times 10^{-3}$ mm/(sample)mm.

Yet further, the present inventors discovered that, by having an adequate amount of austenite remain in the weld metal, the strength of the weld metal can be adjusted so as to be in an appropriate range and too high a degree of over-matching (over-matching results from the strength of the weld metal being too high) can be prevented, while maintaining the aforementioned properties of the weld metal.

When a weld metal having the aforementioned composition is produced, it is necessary to consider not only the welding material but also the degree of dilution resulted from the welded material. That is, it is essential that welding is performed by adjusting the composition of the welding material and the welding conditions (such as the heat inputted by the welding) according to the composition of the low alloy steel as the materials to be welded. With respect to the welding material, the inventors discovered that a composition whose martensitic transformation starting temperature (Ms point temperature) is within the range of 0-170° C. (inclusive of 0° C., and exclusive of 170° C.) suffices at least in the welding conditions applied to ordinary steel structures.

The present invention is achieved by further studying and supplementing the aforementioned discoveries.

Specifically, the present invention proposes a welding material which is an iron based alloy containing, by mass %, 0.20% or less of C, 6.0 to 16.0% of Cr, 6.0 to 16.0% of Ni and having a composition whose martensitic transformation starting temperature (Ms point temperature) is in the range of 0-170° C. (inclusive of 0° C., and exclusive of 170° C.). In the present invention, the aforementioned composition is preferably adjusted such that C, Si, Mn, Cr, Ni, Mo, Nb contents thereof satisfies the following formula (1).

$$0 \leq 719 - 795C - 35.55Si - 13.25Mn - 23.7Cr - 26.5Ni - 23.7Mo - 11.85Nb < 170 \quad (1)$$

(wherein C, Si, Mn, Cr, Ni, Mo, Nb represent the content of each element (mass %), respectively)

In addition, in the present invention, the aforementioned composition preferably contains: 0.20 mass % or less of C; 6.0 to 16.0 mass % of Cr; and 6.0 to 16.0 mass % of Ni. The composition may further contain 1.0 mass % or less of Si and 2.5 mass % or less of Mn, and may yet further contain 4.0 mass % or less of Mo and/or 1.0 mass % or less of Nb. The composition may contain as the balance Fe and other substances which are inevitably mixed into the composition. Further, in the present invention, it is preferable that the composition is a composition in which the amount of linear expansion, in the temperature range from the temperature, at which elongation turns into expansion due to the martensitic transformation immediately after the starting of transformation, to 50° C. in a temperature-elongation curve, is $2 \times 10^{-3}$ to $8 \times 10^{-3}$ mm/(sample)mm.

In a second aspect of the present invention, a method of producing a welded joint, in which the materials to be welded are welded to each other by using the welding material so as to form a welded joint, comprising the steps of: employing a low alloy steel material as the materials to be welded; forming a weld metal by the welding; and adjusting composition of welding materials and welding conditions, according to the composition of the low alloy steel material as the materials to be welded, such that the weld metal is an iron alloy composition containing 0.20 mass % or less of C, 3.0 to 13.0 mass % of Cr, 3.0 to 13.0 mass % of Ni and has a martensitic transformation starting temperature (Ms point temperature) in the range of 50-360° C. (inclusive both 50 and 360). Further, in the second aspect of the present invention, the composition of the aforementioned weld metal is preferably adjusted so as to satisfy the following formula (2).

$$50 \leq 719 - 795C - 35.55Si - 13.25Mn - 23.7Cr - 26.5Ni - 23.7Mo - 11.85Nb < 360 \quad (2)$$

(wherein C, Si, Mn, Cr, Ni, Mo, Nb represent the content of each element (mass %), respectively)

Yet further, in the second aspect of the invention, it is preferable that the martensitic transformation starting temperature (Ms point temperature) of the weld metal is within the range of 50-170° C. (inclusive of 50° C., and exclusive of 170° C.). Yet further, in the second aspect of the present invention, C, Si, Mn, Cr, Ni, Mo, Nb contents of the aforementioned weld metal is preferably adjusted so as to satisfy the following formula (3).

$$50 \leq 719 - 795C - 35.55Si - 13.25Mn - 23.7Cr - 26.5Ni - 23.7Mo - 11.85Nb < 170 \quad (3)$$

(wherein C, Si, Mn, Cr, Ni, Mo, Nb represent the content of each element (mass %), respectively)

Yet further, in the second aspect of the present invention, it is preferable that the weld metal experiences martensitic transformation during the cooling process after welding and reaches, at the room temperature, a state in which the weld metal is expanded as compared with the state thereof when the martensitic transformation started. Yet further, in the second aspect of present invention, it is preferable that the welding is performed without pre-heating, the welding is performed as multi-layered welding, and the composition of the weld metal formed by the first-layer-welding and/or the final layer welding of the multi-layered welding satisfies the aforementioned formula (2) or (3). Further, in the second aspect of the present invention, it is preferable that the amount of linear expansion of the each weld metal, in the temperature range from the temperature, at which elongation turns into expansion due to the martensitic transformation immediately after the starting of transformation, to 50° C. in a temperature-elongation curve of each weld metal, is $2 \times 10^{-3}$ to $8 \times 10^{-3}$ mm/(sample)mm.

In a third aspect of the present invention, a welded joint in which materials to be welded are welded to each other by using a welding material, includes low alloy steel materials as the materials to be welded, wherein a weld metal formed by the welding is an iron alloy composition containing: 0.20 mass % or less of C; 3.0 to 13.0 mass % of Cr; and 3.0-13.0 mass % of Ni and has the martensitic transformation starting temperature (Ms point temperature) within the range of 50-360° C. (inclusive both 50° C. and 360° C.) and the weld metal has a composition exhibiting a temperature-elongation curve in which the weld metal reaches an expanded state, at the room temperature, in which the weld metal is expanded as compared with the state thereof when the martensitic transformation started. In addition, in the third aspect of the invention, the aforementioned weld metal preferably has an iron alloy composition which contains: 0.20 mass % or less of C; 3.0 to 13.0 mass % of Cr; and 3.0 to 13.0 mass % of Ni. The weld metal may further contain 1.0 mass % or less of Si and 2.5 mass % or less of Mn, and may yet further contain 4.0 mass % or less of Mo and/or 1.0 mass % or less of Nb. The weld metal may contain as the balance Fe and other substances which are inevitably mixed into the composition. Further, in the present third aspect of the invention, it is preferable that the composition of the aforementioned weld metal is adjusted such that C, Si, Mn, Cr, Ni, Mo, Nb contents thereof satisfy the aforementioned formula (2). Yet further, in the present third aspect of the invention, it is preferable that the martensitic transformation starting temperature (Ms point temperature) of the weld metal is in the range of 50-170° C. (inclusive of 50° C., and exclusive of 170° C.). Yet further, in the present third aspect of the invention, it is preferable that the aforementioned weld metal is prepared such that C, Si, Mn, Cr, Ni, Mo, Nb contents thereof satisfy the aforementioned formula (3).

Yet further, in the present third aspect of the invention, it is preferable that the amount of linear expansion of the each weld metal, in the temperature range from the temperature, at which elongation turns into expansion due to the martensitic transformation immediately after the starting of transformation, to 50° C. in a temperature-elongation curve of each weld metal, is $2 \times 10^{-3}$ to $8 \times 10^{-3}$ mm/(sample)mm.

DESCRIPTION OF THE INVENTION

Figure 1:
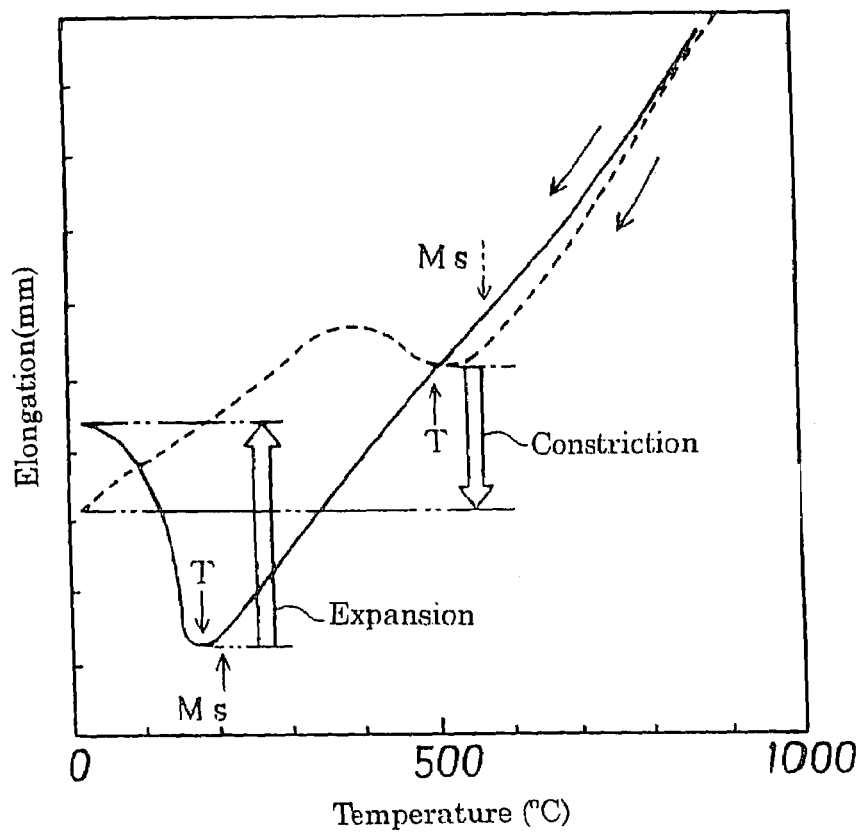
FIG. 1 is an explanatory view which schematically shows a temperature-elongation curve representing one example of transformation properties of a weld metal.
Figure 2:
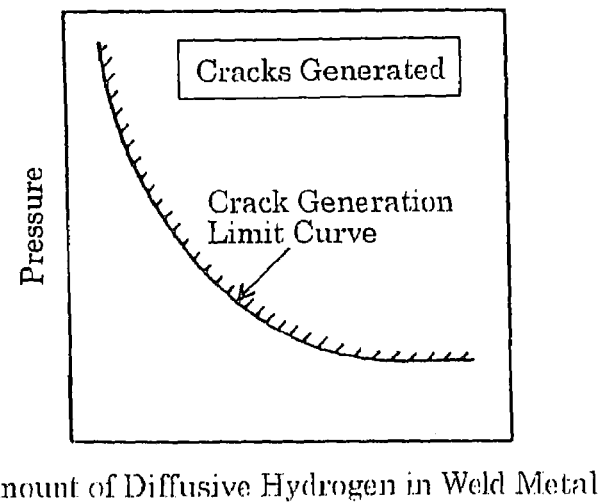
FIG. 2 is an explanatory view which schematically shows the limit of low-temperature cracking generation of a welded joint.

The welding material of the present invention is constituted of an iron based alloy having a composition whose martensitic transformation starting temperature (Ms point temperature) is in the range of 0-170° C. (inclusive of 0° C., and exclusive of 170° C.). When the Ms point temperature is 170° C. or higher, the strength of the weld metal becomes too high as compared with that of the low alloy steel material as the materials to be welded, although the degree of expansion of the weld metal due to the martensitic transformation is relatively large. On the other hand, when the Ms point temperature is lower than 0° C., as the expansion effect of the weld metal due to the martensitic transformation during the cooling process is not sufficient, the low-temperature cracking properties are not improved nor the fatigue strength is increased in a satisfactory manner. Therefore, the welding material of the present invention is limited to the iron based alloy having a composition whose martensitic transformation starting temperature (Ms point temperature) is in the range of 0-170° C. (inclusive of 0° C., and exclusive of 170° C.). As a result, the low-temperature-cracking resistance properties are improved and the fatigue strength of a welded joint is increased.

In addition, by setting the Ms point temperature of the welding material in the range of 0-170° C. (inclusive of 0° C., and exclusive of 170° C.), an appropriate amount of residual austenite remains in the weld metal at the room temperature. Accordingly, abnormal increase in strength due to addition of large amounts of alloy elements can be suppressed and the strength of the weld metal can be set at an appropriate value. In short, concentration of stress onto the weld metal can be prevented.

Next, the composition of the welding material of the present invention, whose Ms point temperature is in the range of 0-170° C. (inclusive of 0° C., and exclusive of 170° C.), will be described hereinafter. It should be noted that the chemical components and the Ms point temperature of the welding material of the present invention are values obtained with respect to a deposital metal produced according to the regulations of JIS Z 3111.

The welding material of the present invention is constituted of an iron based alloy having a composition which contains: 0.20 mass % or less of C; 6.0 to 16.0 mass % of Cr; and 6.0 to 16.0 mass % of Ni. It is preferable that the composition further contains 1.0 mass % or less of Si and 2.5 mass % or less of Mn. It is preferable that the composition yet further contains 4.0 mass % or less of Mo and/or 1.0 mass % or less of Nb. The composition contains as the balance Fe and other substances which are inevitably mixed into the composition ("mass %" will be referred to simply as "%" hereinafter).

C is the element which increases the hardness of martensite, as well as the weld-hardenability properties, and thus facilitates the low-temperature cracking. Therefore, it is preferable that the amount of C is reduced as much as possible. The content of C is to be 0.20% or less in terms of preventing weld-cracking, and is preferably 0.10% or less.

Cr is the element which serves to lower the martensitic transformation starting temperature and thus is one of the important elements in the welding material of the present invention. It is necessary that the Cr content in the welding material of the present invention is 6.0% or more. When the Cr content is less than 6.0%, it is necessary that expensive Ni and some elements which deteriorate formability are added by a large amount in order to lower the martensitic transformation starting temperature below 170° C., causing a problem in economical and productivity terms. On the other hand, when the Cr content exceeds 16.0%, ferrite appears in the weld metal and is not preferable in terms of toughness. Therefore, the Cr content of the welding material is to be in the range of 6.0-16.0%.

Ni is the element which stabilizes martensite and thus is one of the important elements for lowering the martensitic transformation starting temperature (Ms point temperature) below 170° C. Due to this, the Ni content is to be 6.0% or more in the present invention. On the other hand, when the Ni content exceeds 16.0%, such a large Ni content increases the price of the resulting welding material and thus is economically disadvantageous.

Further, as Si decreases the martensitic transformation starting temperature (Ms point temperature), it is preferable that a relatively large amount of Si is contained so that the Ms point temperature is lowered. However, when the Si content exceeds 1.0%, the formability is deteriorated and the productivity of the welding material become poor. Accordingly, it is preferable that the Si content is 1.0% or less.

Mn acts as a deoxidizer. When the Mn content exceeds 2.5%, the formability is deteriorated and the productivity of the welding material become poor. Accordingly, it is preferable that the Mn content is adjusted so as to be 2.5% or less.

In the present invention, the weld metal may contain at least one of Mo and Nb.

Mo may be added so that the corrosion resistance properties of the weld metal are improved. However, when the Mo content exceeds 4.0%, the formability is deteriorated and the productivity of the welding material become poor. Accordingly, it is preferable that the Mo content is 4.0% or less.

Nb decreases the martensitic transformation starting temperature (Ms point temperature). Therefore, it is preferable that a relatively large amount of Nb is contained so that the Ms point temperature is lowered. However, when the Nb content exceeds 1.0%, the formability is deteriorated and the productivity of the welding material become poor. Accordingly, it is preferable that the Nb content is limited to 1.0% or less.

The contents other than those described above (i.e., the balance) are Fe and impurities which are inevitalby mixed into the weld metal. Such inevitable impurities may include: 0.050% or less of N; 0.080% or less of O; 0.010% or less of P; and 0.010% or less of S. Needless to say, Cu plating may be applied to the welding material in terms of corrosion resistance properties.

The welding material of the present invention preferably has the aforementioned range of composition, and the C, Si, Mn, Cr, Ni, Mo, Nb contents of the welding material are preferably adjusted so as to satisfy the following formula (1). It should be noted that, in the present invention, when any of the elements of the formula (1) is not actually contained in the welding material, the formula (1) is calculated by setting the amount of the absent element at zero.

$$0 \leq 719 - 795C - 35.55Si - 13.25Mn - 23.7Cr - 26.5Ni - 23.7Mo - 11.85Nb < 170 \quad (1)$$

(wherein C, Si, Mn, Cr, Ni, Mo, Nb represent the content of each element (mass %), respectively)

By adjusting the composition of the welding material so that the composition satisfies the aforementioned formula (1), the low-temperature-cracking resistance properties can be improved, the fatigue strength of the welded joint can be increased, and abnormal increase in strength of the weld metal can be suppressed. In some cases, the weld-cracking resistance properties and the fatigue strength can somehow be ensured, although the composition of the welding material thereof does not satisfy the formula (1). However, in such cases, there arises a problem of over-matching due to a large increase in strength of the weld metal.

Further, it is preferable that the welding material of the present invention has a composition in which the amount of linear expansion, in the temperature range from the temperature, at which elongation turns into expansion due to the martensitic transformation (i.e., the temperature observed immediately after the starting of transformation in the cooling process at which temperature the elongation is smallest), to 50° C. in a temperature-elongation curve, is $2 \times 10^{-3}$ to $8 \times 10^{-3}$ mm/(sample)mm.

It should be noted that the amount of linear expansion of the welding material of the present invention is the value obtained from a weld metal produced according to the regulations of JIS Z 3111.

When the amount of linear expansion in the aforementioned temperature range is less than $2 \times 10^{-3}$ mm/(sample) mm or larger than $8 \times 10^{-3}$ mm/(sample)mm, the tensile residual stress is remained in the welding portion and thus cracking will likely to occur.

Next, a welded joint of the present invention is produced by welding materials to be welded to each other, by using the welding material of the present invention.

In the welded joint of the present invention, a low alloy steel is used as the materials to be welded. As the low alloy steel, a high-tensile strength steel material of 490-980 MPa grade having thickness of 20 mm or more is preferable, and an extra-large thick high-tensile strength steel material of 490 MPa grade having thickness of 75 mm or more and a high-tensile strength steel material of 590-1180 MPa grade is especially preferable. However, the composition of the low alloy steel material used in the present invention is not particularly limited, and any known conventional steel material can be employed.

In the present invention, a weld metal having an appropriate composition is formed by adjusting the comosition of the welding material, the welding method and the welding conditions in accordance with the materials to be welded. In producing the welded joint of the present invention, any of various welding methods such as shielded metal arc welding, gas metal arc welding, submerge arc welding and FCW can be suitably applied. With respect to the shape of the joint, any shapes of the joints used for large structures like ships, marine structures, penstock, bridges, tanks, construction machines and the like (specifically, fillet weld joints such as a corner-around joint, a non-load-transmission type cruciform welded joint, a butt welded joint) can be suitably used.

Next, the weld metal of the welded joint of the present invention will be described hereinafter.

In the weld metal of the welded joint of the present invention, the temperature-elongation curve (i.e., the thermal expansion curve) thereof exhibits a temperature-elongation curve in which the weld metal is expanded, at the room temperature, as compared with the state thereof when the martensitic transformation started. FIG. 1 shows one example of the temperature-elongation curve of the weld metal of the welded joint of the present invention. The weld metal (solid line) of the present invention experiences martensitic transformation during the cooling process, and due to the expansion by the martensitic transformation, at the room temperature, reaches a state in which the weld metal is expanded as compared with the state thereof when the martensitic transformation started. By employing a weld metal having such a composition, in the welded joint, a tensile stress due to constriction during the cooling process is alleviated or the compressive stress is remained. On the other hand, in the case of a weld metal whose composition is beyond the range of the present invention (dotted line), as the martensitic transformation starting temperature (Ms) is relatively high and the degree of expansion due to the martensitic transformation is relatively low, the weld metal reaches, at the room temperature, a state in which the weld metal has shrunk due to the cooling after the transformation. It should be noted that, the profile of the transformation of the weld metal of the present invention is obtained from a temperature-elongation curve (a thermal expansion curve) which can be produced by continuously measuring changes in elongation (due to normal thermal expansion) corresponding the temperature changes.

In order to obtain a weld metal in such a state, it is necessary that the composition of the weld metal, which varies in accordance with the materials to be welded, the welding material and the welding conditions, is the composition whose martensitic transformation starting temperature (Ms point temperature) is in the range of 50-360° C. (inclusive of both 50° C. and 360° C.). When the Ms point temperature exceeds 360° C., the degree of expansion by the martensitic transformation is decreased and the maximum peak of the transformational expansion becomes too high with respect to the room temperature. As a result, heat-constriction occurs again due to cooling after the transformation and a tensile residual stress is generated, thereby deteriorating the low-temperature-cracking resistance properties. In addition, when the Ms point temperature is lower than 50° C., the expansion effect by the martensitic transformation during the cooling process is not sufficient and the low-temperature-cracking resistance properties are not improved so much. Due to this, the composition of the weld metal of the present invention is limited to a composition in which the martensitic transformation starting temperature (Ms point temperature) of the weld metal is in the range of 50-360° C. (inclusive of both 50° C. and 360° C.). As a result, the low-temperature-cracking resistance properties are significantly improved. It should be noted that, in order to further improve the low-temperature-cracking resistance properties, it is more preferable that the Ms point temperature of the weld metal is in the range of 50-170° C. (inclusive of 50° C., and exclusive of 170° C.).

Although the Ms point temperature of the weld metal is in the range of 50-360° C. (inclusive of both 50° C. and 360° C.), if the amount of linear expansion of the weld metal, in the temperature range from the temperature, at which elongation turns into expansion due to the martensitic transformation immediately after the starting of transformation (FIG. 1: point T), to 50° C. in a temperature-elongation curve, is less than $2 \times 10^{-3}$ mm/(sample)mm, low-temperature-cracking is likely to be generated because the tensile residual stress is applied to the portion which is affected by the welding heat. On the other hand, if the amount of linear expansion of the weld metal in the aforementioned temperature range from point T to 50° C. exceeds $8 \times 10^{-3}$ mm/(sample)mm, the tensile residual stress is generated on the root portions of the weld metal and thus cracking will likely to occur in the weld metal. Therefore, it is preferable that the amount of linear expansion of the weld metal, in the temperature range from the temperature (point T), at which elongation turns into expansion due to the martensitic transformation immediately after the starting of transformation, to 50° C. in a temperature-elongation curve of each weld metal, is $2 \times 10^{-3}$ to $8 \times 10^{-3}$ mm/(sample)mm.

In order to obtain a weld metal having the martensitic transformation starting temperature (Ms point temperature) of such a range, the composition of the weld metal is an iron alloy composition which contains: 0.20 mass % or less of C; 3.0 to 13.0 mass % of Cr; and 3.0 to 13.0 mass % of Ni. It is preferable that the iron alloy composition further contains 1.0 mass % or less of Si and 2.5 mass % or less of Mn and yet further contains 4.0 mass % or less of Mo and/or 1.0 mass % or less of Nb. The iron alloy composition contains as the balance Fe and other substances which are inevitably mixed into the composition ("mass %" will be referred to simply as "%" hereinafter).

C is the element which increases the hardness of martensite, as well as the welding hardening properties, and thus facilitates the low-temperature cracking. Therefore, it is preferable that the amount of C is reduced as much as possible. The content of C is to be 0.20% or less in terms of preventing weld-cracking, and is preferably 0.12% or less.

Cr is the element which serves to lower the martensitic transformation starting temperature and thus is one of the important elements in the weld metal of the present invention. It is necessary that the Cr content in the weld metal of the present invention is 3.0% or more. When the Cr content is less than 3.0%, it is necessary that expensive Ni and some elements which deteriorate formability of the welding material are added, by a large amount, to the welding material in order to lower the martensitic transformation starting temperature below 360° C., which causes a problem in economical and productivity terms. On the other hand, when the Cr content exceeds 13.0%, ferrite appears in the weld metal and is not preferable in terms of toughness. Therefore, the Cr content of the welding metal is to be in the range of 3.0-13.0%.

Ni is the element which stabilizes martensite and thus is one of the important elements for lowering the martensitic transformation starting temperature (Ms point temperature) below 360° C. Due to this, the Ni content of the weld metal is to be 3.0% or more in the present invention. On the other hand, when the Ni content exceeds 13.0%, such a large Ni content increases the price of the resulting welding material and thus is economically disadvantageous.

Further, as Si decreases the martensitic transformation starting temperature (Ms point temperature), it is preferable that a relatively large amount of Si is contained so that the Ms point temperature is lowered. However, since Si is supplied as a deoxidizer mainly from the welding material, an attempt to increase the Si content of the weld metal to more than 1.0% will inevitably deteriorate the formability in producing the welding material. Accordingly, it is preferable that the Si content is 1.0% or less.

Mn is supplied as a deoxidezer from the welding material. An attempt to increase the Mn content of the weld metal to more than 2.5% will inevitably deteriorate the formability in producing the welding material. Accordingly, it is preferable that the Mn content is adjusted so as to be 2.5% or less.

In the present invention, the weld metal may contain at least one of Mo and Nb.

Mo may be added so that the corrosion resistance properties of the weld metal are improved. However, an attempt to increase the Mo content of the weld metal to more than 4.0% will inevitably deteriorate the formability in producing the welding material. Accordingly, it is preferable that the Mo content is 4.0% or less.

Nb functions so as to lower the martensitic transformation starting temperature (Ms point temperature). Therefore, it is preferable that a relatively large amount of Nb is contained so that the Ms point temperature is lowered. However, an attempt to increase the Nb content of the weld metal to more than 1.0% will inevitably deteriorate the formability in producing the welding material. Accordingly, it is preferable that the Nb content is limited to 1.0% or less.

With respect to the elements other than those described above, there is no particular restriction. V, Cu, REM may be contained by the amount of 0.5% or less, respectively. It should be noted that, if some elements other than those described above, which are inevitably contained in the materials to be welded or the welding material, are inevitably mixed into the weld metal, there will arise no problems.

In the present invention, it is preferable that the composition of the weld metal is in the aforementioned range. In addition, it is preferable that the C, Si, Mn, Cr, Ni, Mo, Nb contents of the weld metal is adjusted so as to satisfy the following formula (2). It should be noted that, in the present invention, when any of the elements of the formula (2) is not actually contained in the weld metal, the formula (2) is calculated by setting the amount of the absent element at zero.

$$50 \leq 719-795C-35.55Si-13.25Mn-23.7Cr-26.5Ni-23.7Mo-11.85Nb<360 \quad (2)$$

(wherein C, Si, Mn, Cr, Ni, Mo, Nb represent the content of each element (mass %), respectively)

Further, in terms of further improving the low-temperature-cracking resistance properties, it is preferable that the composition of the weld metal is adjusted so as to satisfy the following formula (3).

$$50 \leq 719-795C-35.55Si-13.25Mn-23.7Cr-26.5Ni-23.7Mo-11.85Nb<170 \quad (3)$$

(wherein C, Si, Mn, Cr, Ni, Mo, Nb represent the content of each element (mass %), respectively)

By adjusting the composition of the weld metal such that the composition satisfies the aforementioned formula (2) or (3), the low-temperature-cracking resistance properties are improved. When the composition of the weld metal does not satisfy the formula (2) or (3), the degree of expansion by the martensitic transformation of the weld metal is relatively small, the tensile residual stress generated in the welded joint is not alleviated so much or the compressive residual stress is not generated. As a result, the low-temperature-cracking resistance properties are poor.

In the present invention, the welded joint is formed by welding the materials to be welded (made of a low alloy steel materials) to each other by using the welding material. Here, the composition of the welding material and the welding conditions (such as the heat input during welding) are adjusted, in accordance with the composition of the low alloy steel material, such that the weld metal having the aforementioned composition and characteristic are formed.

Figure 3:
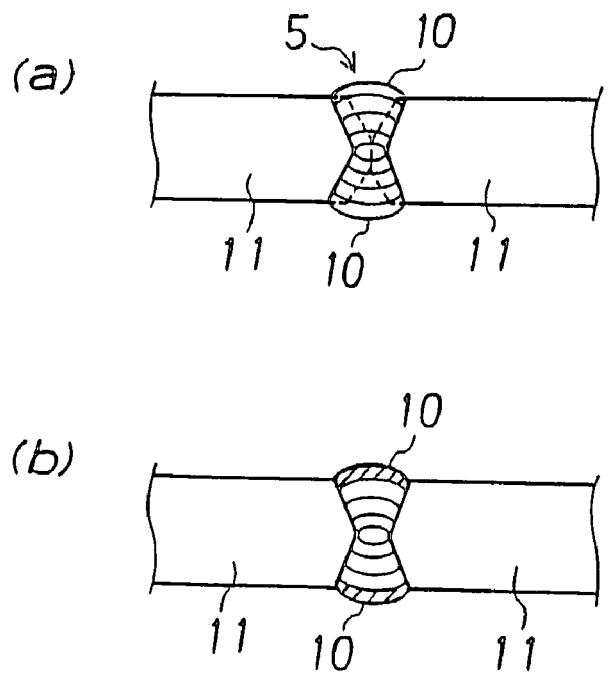
FIG. 3 is an explanatory view which shows one example of butt welded joint as an embodiment of the present invention.

Next, a method of producing welded joints having various joint shape will be described with reference to the accompanying drawings. FIG. 3 shows an example of producing a welded joint by multi-layered welding, in which example end portions of the materials to be welded 11 are opposed to each other (the end portions of the materials to be welded 11 have been processed so as to have a predetermined groove shape (X-shaped groove in this case)) and a number of welding layers are stacked in an overlapped manner in the groove. The number of stacked welding layers is determined in accordance with the plate thickness of the materials to be welded. In the case shown in FIG. 3, as the materials to be welded are extremely thick, it is preferable that the welding layers are stacked from both sides with respect to the thickwise center of the plates such that the welding final layers 10 are formed on the both sides of the plate. It should be noted that the welding layers may be stacked from only one side of the plate.

In the present invention, it is preferable that the weld metal formed by each layer-welding is adjustingly prepared so as to be a weld metal having a composition whose martensitic transformation starting temperature (Ms point temperature) is in the range of 50-360° C., more preferably, in the range of 50-170° C., inclusive of 50° C. and exclusive of 170° C.

As a result, the tensile residual stress generated in the weld metal is alleviated by the transformational expansion or the compressive stress is made to remain, thereby improving the low-temperature-cracking resistance properties. Here, it is preferable that a next layer is stacked onto the previously provided layer, while the temperature of the weld metal of the previously provided layer is no lower than the martensitic transformation starting temperature (Ms point temperature).

It should be noted that, in many cases of multi-layered welding, it is acceptable that only the weld metal formed by at least the first layer welding or the final layer welding as well, has the aforementioned weld metal composition, as shown in FIG. 3(b). This simpler arrangement still prevents occurrence of low-temperature-cracking without the help of the pre-heating and/or post-heating treatment. In short, it is not always necessary that the layers other than the first layer, or final layer of the weld metal are made of the weld metal having the aforementioned composition and characteristics.

In the present invention, it is preferable that at least the first layer or the final layer of the weld metal formed by each layer welding are formed such that the amount of linear expansion thereof, in the temperature range from the temperature, at which elongation turns into expansion due to the martensitic transformation immediately after the starting of transformation, to 50° C., is $2\times10^{-3}$ to $8\times10^{-3}$ mm/(sample) mm. By setting the amount of the linear expansion of the weld metal within the aforementioned range, the weld-cracking-sensitivity resistance properties are improved.

Figure 4:
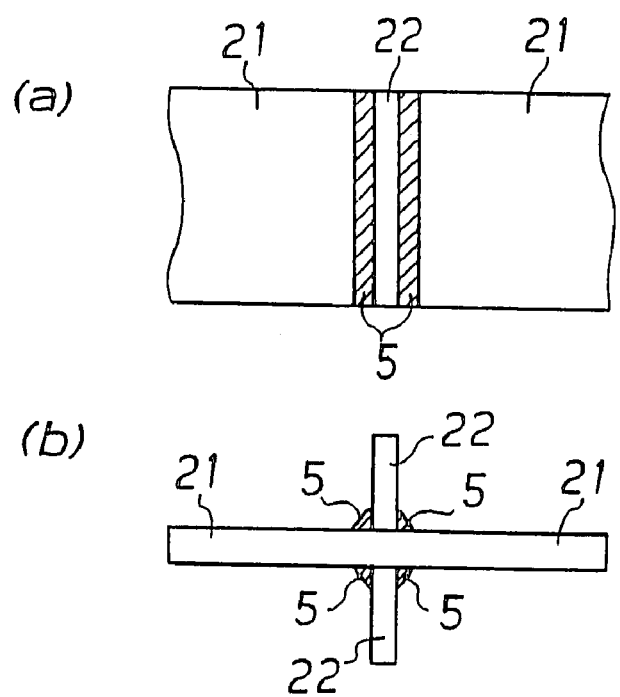
FIG. 4 is an explanatory view which shows one example of cruciform welded joint as an embodiment of the present invention.

In addition, as shown in FIG. 4, the present invention can be effectively applied when producing a cruciform welded joint. In this case, as is in the aforementioned case, it is preferable that the welding material and the welding conditions are adjusted such that the resulting weld metal has the composition of the aforementioned range of the present invention. With such an arrangement, occurrence of low-temperature-cracking can be reliably prevented as is in the aforementioned case.

Further, needless to say, the present invention can be applied to the cases of build-up welding and the like including fillet welding, circumferential welding and mending welding.

Next, examples of preferable combinations of a material to be welded and a welding material are raised below.

First, as the material to be welded, a high-tensile strength steel material of 780 MPa grade which contains: 0.05-0.20% of C; 0.05-0.30% of Si; 0.50-1.50% of Mn; 3% or less of Cr; 3% or less of Ni; 1% or less of Mo; at least two elements of the group consisting of 0.5% or less of Cu, 0.020% or less of Nb, 0.02% or less of V, 0.02% or less of Ti and 0.020% or less of P; and the balance including Fe and other inevitable impurities, may be used. In this case, as the welding material for the shielded arc welding, a welding material in which the composition of the weld metal according to the regulation of JIS Z 3111 contains: 0.20% or less of C; 1.00% or less of Si; 2.0% or less of Mn; 3-13% of Cr; 3-13% of Ni; at least one element of the group consisting of 1.0% or less of Mo, 0.10% or less of Nb, 0.05% or less of Ti, 0.10% or less of V and 0.5% or less of Cu; and the balance including Fe and other inevitable impurities, may be used. Here, it is preferable that the welding is performed with heat input of 5-50 kJ/cm. In the case of the gas metal arc welding, it is preferable that the welding is performed with heat input of 5-100 kJ/cm.

EXAMPLES

Example 1

The weld-cracking properties were investigated by: using the low alloy steel materials (steel plates) having the compositions shown in Table 1 as the material to be welded; using the compositions shown in Table 2 (the compositions of deposital metal measured according to JIS Z 3111) as the welding material; and using test pieces according to the regulations of JIS Z 3158, under the welding conditions shown in Table 3.

The tests were conducted in an atmosphere in which the temperature was 30° C. and the relative humidity was 80% as condition 1 and in an atmosphere in which the temperature was 20° C. and the relative humidity was 60% as condition 2, without pre-heating. The test-repeating number was 3, and with respect to the crack generated in the welded portion, presence/absence of crack and the crack rate were measured according to the regulations of JIS Z 3158. The results are shown in FIG. 4.

In the present example, no low-temperature-cracking was observed, although pre-heating was not conducted. In the comparative example, on the other hand, generation of crack was observed in the condition 1 which is a harsh testing condition.

Example 2

A butt welded joint and a cruciform welded joint (the joint length was 0.5 m) shown in FIGS. 3 and 4 were produced by: using the low alloy steel materials (steel plates) having the compositions shown in Table 1 as the material to be welded; and using some of the welding materials whose compositions (the compositions of diposital metal measured according to JIS Z 3111) are shown in Table 2, under the welding conditions shown in Table 5 (without pre-heating and post-heating).

With respect to these welded joints, the state of crack-generation in the welded portions were investigated by observing the surface of the portions. In addition, with respect to each welded joint, the hardness of the parent material portion and the hardness of the weld metal portion (the average hardness of the weld metal section) were measured. Further, the amount of residual austenite in the weld metal was measured by the X-ray diffraction method. Yet further, fatigue test pieces were collected from these welded joints and the unidirection fatigue test under pulsating tension was conducted in the atmosphere of the room temperature, to obtain the fatigue strength values after the two-million-times movement. The results are shown in Table 6.

From the results, it is understood that the present example shows no generation of cracks, high fatigue strength, and excellent welding low-temperature-cracking resistance properties and excellent fatigue resistance properties. In addition, in the present example, as the amount of residual austenite in the weld metal is relatively large, the hardness of the weld metal is relatively low and the difference in strength between the weld metal and the parent material is relatively small. Accordingly, any significant increase in strength of the weld metal can be suppressed. On the other hand, in the comparative example whose composition is beyond the range of the present invention, the amount of residual austenite is small, the hardness of the weld metal is high and thus the difference in strength between the weld metal and the parent material is significantly large, although the example shows no weld-crack generation, relatively high fatigue strength, excellent welding low-temperature-cracking resistance properties and fatigue resistance properties, as is in the examples of the present invention. In short, the degree of over-matching of the comparative example is larger the examples according to the present invention.

Example 3

The weld-cracking properties were investigated by: using the low alloy steel materials (steel plates) having the compositions shown in Table 7 as the material to be welded; using the compositions shown in Table 8 (the compositions of deposital metal measured according to JIS Z 3111) as the welding material; and using test pieces according to the regulations of JIS Z 3158, under the welding conditions shown in Table 9.

The tests were conducted in an atmosphere in which the temperature was 30° C. and the relative humidity was 80% (condition 1) and in an atmosphere in which the temperature was 20° C. and the relative humidity was 60% (condition 2), without pre-heating. Next, an analysis on the composition of the weld metal formed therein was conducted in the vicinity of the bead center portion. The test-repeating number was 3, and with respect to the cracking generated in the welded portion, presence/absence of crack and the cracking rate were measured according to the regulations of JIS Z 3158.

Further, a test piece for the thermal expansion test was collected from the formed weld metal and a temperature-elongation curve was obtained. The amount of linear expansion/(sample)mm, in the temperature range from the temperature, at which elongation turns into expansion due to the martensitic transformation immediately after the starting of transformation, to 50° C., was measured from the temperature-elongation curve.

The results are shown in FIG. 10.

In the present example, no low-temperature-cracking was observed when the example was conducted under the condition 2, although pre-heating was not conducted therein. On the contrary, in the comparative example whose composition is beyond the range of the present invention, generation of cracks was observed when the example was conducted under the condition 2.

In the present example, which satisfies the formula (3) described above, no low-temperature-cracking was observed even when the example was conducted under the condition 1 which is harsher than the condition 2. The welded joints Nos. 3-18 to 3-21 as the examples of the present invention exhibit relatively large amounts of linear expansion ranging from $5.8 \times 10^{-3}$ to $7.1 \times 10^{-3}$ mm/(sample) mm. These results clearly demonstrate the significant improvement of the welding crack resistance properties.

Example 4

A butt welded joint and a cruciform welded joint (the joint length was 0.5 m) shown in FIGS. 3 and 4 were produced by: using some of the low alloy steel materials (steel plates) having the compositions shown in Table 7 as the materials to be welded; and using some of the welding materials whose compositions (the compositions of the disposital metals measured according to JIS Z 3111) are shown in Table 8, under the welding conditions shown in Table 11 (without pre-heating and post-heating). With respect to these welded joints, the state of crack-generation in the welded portions were investigated by observing the surface of the portions. It should be noted that, with respect to some of the joints, the first and the final layers were made of the weld metal in the range of the present invention. The results are shown in Table 12.

In the present example, no crack generation was observed.

TABLE 1

| Steel Plate No. | Chemical Compositions (mass %) | | | | | | | | | | | | | | Yield Strength (MPa) | Tensile Strength (MPa) | Plate Thickness (mm) |
|---|---|---|---|---|---|---|---|---|---|---|---|---|---|---|---|---|---|
| | C | Si | Mn | P | S | Al | Cu | Ni | Cr | Mo | V | Nb | Ti | B | | | |
| A | 0.12 | 0.14 | 0.89 | 0.002 | 0.001 | 0.059 | 0.25 | 1.29 | 0.44 | 0.52 | 0.039 | 0.002 | 0.005 | 0.0012 | 686 | 811 | 45 |
| B | 0.06 | 0.22 | 0.61 | 0.003 | 0.001 | 0.029 | 0.01 | 9.25 | 0.02 | 0.01 | 0.009 | 0.008 | 0.002 | 0.0001 | 622 | 711 | 30 |
| C | 0.13 | 0.24 | 1.33 | 0.003 | 0.001 | 0.028 | 0.02 | 0.01 | 0.03 | 0.052 | 0.040 | 0.002 | 0.002 | — | 402 | 554 | 30 |

TABLE 2

| Welding Material No. | Chemical Compositions (mass %)*** | | | | | | | | | | | | | | Rod/Wire Diameter (mm) | M Value of Formula (1)** |
|---|---|---|---|---|---|---|---|---|---|---|---|---|---|---|---|---|
| | C | Si | Mn | P | S | Al | Cu | Ni | Cr | Mo | V | Nb | Ti | H* | | |
| a | 0.022 | 0.28 | 0.71 | 0.012 | 0.011 | 0.030 | — | 9.2 | 12.4 | 0.24 | 0.029 | 0.002 | 0.001 | 4 | 5.0 | 139 |
| b | 0.030 | 0.24 | 0.79 | 0.011 | 0.014 | 0.029 | — | 10.4 | 15.2 | 0.12 | 0.019 | 0.003 | 0.002 | 3 | 1.2 | 37 |
| c | 0.024 | 0.24 | 0.81 | 0.012 | 0.009 | 0.033 | — | 9.4 | 13.2 | 0.22 | 0.022 | 0.003 | 0.002 | 3 | 4.0 | 114 |
| D | 0.025 | 0.25 | 0.69 | 0.014 | 0.012 | 0.032 | — | 11.1 | 12.5 | 0.16 | 0.021 | 0.003 | 0.003 | 4 | 1.4 | 87 |
| E | 0.029 | 0.22 | 0.77 | 0.013 | 0.012 | 0.031 | — | 5.7 | 13.1 | 0.29 | 0.018 | 0.002 | 0.003 | 4 | 4.0 | 220 |
| F | 0.030 | 0.24 | 0.81 | 0.014 | 0.013 | 0.032 | — | 11.1 | 5.4 | 0.28 | 0.019 | 0.002 | 0.003 | 3 | 1.4 | 258 |
| G | 0.019 | 0.24 | 0.82 | 0.013 | 0.013 | 0.032 | — | 5.2 | 12.8 | 0.22 | 0.031 | 0.002 | 0.002 | 4 | 1.2 | 249 |

| Welding Material No. | Satisfies or not Formula (1) | Ms point temperature*** (° C.) | Yield Strength (MPa)*** | Tensile Strength (MPa)*** | Welding Method**** | Note |
|---|---|---|---|---|---|---|
| a | ○ | 142 | 682 | 781 | SMAW | Example of the present Invention |
| b | ○ | 39 | 670 | 769 | FCW | Example of the present Invention |
| c | ○ | 119 | 711 | 801 | SMAW | Example of the present Invention |
| D | ○ | 92 | 680 | 779 | MAG | Example of the present Invention |
| E | X | 228 | 921 | 1104 | SMAW | Comparative Example |
| F | X | 264 | 861 | 1021 | FCW | Comparative Example |
| G | X | 258 | 893 | 1091 | MAG | Comparative Example |

*ppm
**M = 719-795C—35.55Si—13.25Mn—23.7Cr—26.5Ni—23.7Mo—11.85Nb
***Deposital Metal according to JIS Z 3111
****SMAW: Shielded Metal Arc Welding
FCW: Flux-Cored Wire
MAG: Gas Metal Arc Welding (Metal Active Gas Welding)

TABLE 3

| | Combination | | Welding Condition | | | | | | | |
|---|---|---|---|---|---|---|---|---|---|---|
| Joint No. | Steel Plate No. | Welding Material No. | Welding Method* | Voltage V | Electric Current A | Welding Rate cm/min | Atmospheric Gas | Heat Input kJ/cm | Number of Stacked Layers | Pre-heating |
| 1 | A | a | SMAW | 15 | 220 | 15 | — | 17 | 1 | Not performed |
| 2 | B | a | SMAW | 15 | 220 | 15 | — | 17 | 1 | Not performed |
| 3 | C | a | SMAW | 15 | 220 | 15 | — | 17 | 1 | Not performed |

TABLE 3-continued

| | Combination | | Welding Condition | | | | | | | |
|---|---|---|---|---|---|---|---|---|---|---|
| Joint No. | Steel Plate No. | Welding Material No. | Welding Method* | Voltage V | Electric Current A | Welding Rate cm/min | Atmospheric Gas | Heat Input kJ/cm | Number of Stacked Layers | Pre-heating |
| 4 | A | b | FCW | 15 | 220 | 15 | — | 17 | 1 | Not performed |
| 5 | A | c | SMAW | 15 | 220 | 15 | — | 17 | 1 | Not performed |
| 6 | A | d | MAG | 15 | 220 | 15 | 80% Ar + 20% $CO_2$ | 17 | 1 | Not performed |
| 7 | A | e | SMAW | 15 | 220 | 15 | — | 17 | 1 | Not performed |
| 8 | A | f | FCW | 15 | 220 | 15 | — | 17 | 1 | Not performed |
| 9 | A | g | MAG | 15 | 220 | 15 | 80% Ar + 20% $CO_2$ | 17 | 1 | Not performed |
| 10 | B | b | FCW | 15 | 220 | 15 | — | 17 | 1 | Not performed |
| 11 | B | c | SMAW | 15 | 220 | 15 | — | 17 | 1 | Not performed |
| 12 | B | d | MAG | 15 | 220 | 15 | 80% Ar + 20% $CO_2$ | 17 | 1 | Not performed |

*SMAW: Shielded Metal Arc Welding
FCW: Flux-Cored Wire
MAG: Gas Metal Arc Welding (Metal Active Gas Welding)

TABLE 4

| | Combination | | Weld Cracking (%)* Condition (1) | | | Weld Cracking (%)* Condition (2) | | | |
|---|---|---|---|---|---|---|---|---|---|
| Joint No. | Steel Plate No. | Welding Material No. | Surface Cracking | Section Cracking | Root Cracking | Surface Cracking | Section Cracking | Root Cracking | Note |
| 1 | A | a | 0 | 0 | 0 | 0 | 0 | 0 | Example of the present Invention |
| 2 | B | a | 0 | 0 | 0 | 0 | 0 | 0 | Example of the present Invention |
| 3 | C | a | 0 | 0 | 0 | 0 | 0 | 0 | Example of the present Invention |
| 4 | A | b | 0 | 0 | 0 | 0 | 0 | 0 | Example of the present Invention |
| 5 | A | c | 0 | 0 | 0 | 0 | 0 | 0 | Example of the present Invention |
| 6 | A | d | 0 | 0 | 0 | 0 | 0 | 0 | Example of the present Invention |
| 7 | A | e | 0 | 12 | 39 | 0 | 0 | 0 | Comparative Example |
| 8 | A | f | 0 | 18 | 61 | 0 | 0 | 0 | Comparative Example |
| 9 | A | g | 0 | 22 | 61 | 0 | 0 | 0 | Comparative Example |
| 10 | B | b | 0 | 0 | 0 | 0 | 0 | 0 | Example of the present Invention |
| 11 | B | c | 0 | 0 | 0 | 0 | 0 | 0 | Example of the present Invention |
| 12 | B | d | 0 | 0 | 0 | 0 | 0 | 0 | Example of the present Invention |

*Average of three Joints

TABLE 5

| Type of Joint | Welding Method* | Welding Condition | | | | | | |
|---|---|---|---|---|---|---|---|---|
| | | Voltage V | Electric Current A | Welding Rate cm/min | Atmospheric Gas | Heat Input kJ/cm | Number of Stacked Layers No | Pre-heating |
| Butt | SMAW | 20 | 210 | 10 | — | 43 | 1 | Not performed |
| | | 20 | 210 | 11 | — | 38 | Final Layer | Not performed |
| Cruciform | MAG | 33 | 240 | 60 | 80% Ar + 20% $CO_2$ | 8 | 1 | Not performed |
| | | 33 | 240 | 60 | | 8 | 2 | Not performed |
| Cruciform | SMAW | 20 | 210 | 10 | — | 43 | 1 | Not performed |
| Cruciform | FCW | 33 | 240 | 40 | — | 10 | 1 | Not performed |

*SMAW: Covered Arc Welding
MAG: Gas Metal Arc Welding (Metal Active Gas Welding)
FCW: Flux-Cored Wire

TABLE 6

| Joint No. | Combination | | | Welding Method | Presence/ Absence of Cracks at the Welded Portion | Fatigue Resistance Properties Fatigue Strength after two-million-times Movement MPa | Weld Metal Portion | | Parent Material Portion | Difference in Hardness | Note |
|---|---|---|---|---|---|---|---|---|---|---|---|
| | Steel Plate No No. | Welding Material No. | Type of Joint | | | | Residual Austenite Vol % | Average Hardness $Hv_{WM}$ | Average Hardness $Hv_{BM}$ | $\Delta Hv$ (: $Hv_{WM} - Hv_{BM}$) | |
| 2-1 | A | a | Cruciform | SMAW | None | 105 | 15.2 | 302 | 270 | 42 | Example of the present Invention |
| 2-2 | A | a | Cruciform | SMAW | None | 100 | 14.8 | 299 | 230 | 69 | Example of the present Invention |
| 2-3 | A | a | Cruciform | SMAW | None | 102 | 17.2 | 241 | 200 | 41 | Example of the present Invention |
| 2-4 | A | b | Cruciform | FCW | None | 110 | 19.1 | 312 | 274 | 38 | Example of the present Invention |
| 2-5 | A | c | Butt | SMAW | None | 112 | 18.4 | 309 | 274 | 35 | Example of the present Invention |
| 2-6 | A | d | Cruciform | MAG | None | 105 | 16.1 | 310 | 274 | 36 | Example of the present Invention |
| 2-7 | A | e | Cruciform | SMAW | None | 112 | 1.2 | 401 | 280 | 131 | Comparative Example |
| 2-8 | A | f | Cruciform | FCW | None | 108 | <1 | 420 | 274 | 146 | Comparative Example |
| 2-9 | A | g | Cruciform | MAG | None | 102 | <1 | 410 | 272 | 138 | Comparative Example |
| 2-10 | B | e | Butt | SMAW | None | 104 | <1 | 400 | 281 | 119 | Comparative Example |
| 2-11 | B | a | Cruciform | SMAW | None | 108 | 16.1 | 312 | 279 | 33 | Example of the present Invention |
| 2-12 | B | b | Cruciform | FCW | None | 112 | 19.8 | 316 | 279 | 37 | Example of the present Invention |

TABLE 7

| Steel Plate No. | Chemical Compositions (mass %) | | | | | | | | | | | | | | Plate Thickness mm |
|---|---|---|---|---|---|---|---|---|---|---|---|---|---|---|---|
| | C | Si | Mn | P | S | Al | Cu | Ni | Cr | Mo | V | Nb | Ti | B | |
| D | 0.11 | 0.16 | 0.83 | 0.003 | 0.001 | 0.066 | 0.25 | 1.27 | 0.49 | 0.50 | 0.035 | 0.001 | 0.005 | 0.0011 | 40 |
| E | 0.12 | 0.26 | 1.31 | 0.003 | 0.001 | 0.035 | 0.02 | 0.01 | 0.03 | 0.056 | 0.039 | 0.002 | 0.002 | 0.0001 | 45 |
| F | 0.06 | 0.24 | 0.59 | 0.003 | 0.001 | 0.030 | 0.01 | 9.29 | 0.02 | 0.01 | 0.005 | 0.008 | 0.002 | 0.0001 | 38 |
| G | 0.07 | 0.25 | 0.61 | 0.003 | 0.001 | 0.031 | 0.01 | 4.89 | 0.02 | 0.02 | 0.003 | 0.012 | 0.002 | 0.0003 | 30 |
| H | 0.11 | 0.20 | 0.81 | 0.003 | 0.001 | 0.50 | 0.24 | 1.21 | 0.48 | 0.52 | 0.033 | 0.001 | 0.004 | 0.0010 | 50 |

TABLE 8

| Welding Material No. | Chemical Compositions (mass %) | | | | | | | | | | | | | | H* ppm | Rod/Wire Diameter mm | Note |
|---|---|---|---|---|---|---|---|---|---|---|---|---|---|---|---|---|---|
| | C | Si | Mn | P | S | Al | Cu | Ni | Cr | Mo | V | Nb | Ti | B | | | |
| h | 0.025 | 0.33 | 0.70 | 0.013 | 0.014 | 0.031 | — | 10.0 | 10.0 | 0.13 | 0.032 | 0.003 | 0.004 | — | 4 | 4.0 | |
| i | 0.019 | 0.26 | 0.69 | 0.012 | 0.011 | 0.033 | — | 4.2 | 12.9 | 0.01 | 0.024 | 0.003 | 0.003 | — | 3 | 1.4 | Flux-Cored |
| j | 0.022 | 0.22 | 0.88 | 0.011 | 0.012 | 0.029 | — | 12.8 | 3.9 | 0.02 | 0.011 | 0.004 | 0.004 | — | 3 | 5.0 | |
| k | 0.029 | 0.26 | 0.89 | 0.012 | 0.012 | 0.033 | — | 7.8 | 11.5 | 0.52 | 0.022 | 0.005 | 0.006 | — | 2 | 1.2 | |
| l | 0.026 | 0.33 | 0.78 | 0.012 | 0.011 | 0.028 | — | 6.9 | 12.8 | 0.15 | 0.025 | 0.033 | 0.002 | — | 4 | 4.0 | |
| m | 0.017 | 0.25 | 0.71 | 0.013 | 0.008 | 0.028 | — | 8.9 | 10.8 | 0.17 | 0.009 | 0.004 | 0.003 | — | 4 | 1.2 | Flux-Cored |
| n | 0.022 | 0.22 | 0.81 | 0.012 | 0.011 | 0.030 | — | 12.9 | 12.7 | 0.13 | 0.008 | 0.003 | 0.004 | — | 3 | 1.2 | |
| o | 0.031 | 0.31 | 0.79 | 0.014 | 0.010 | 0.031 | — | 10.4 | 3.4 | 0.16 | 0.011 | 0.003 | 0.004 | — | 4 | 1.4 | Flux-Cored |
| p | 0.028 | 0.33 | 0.84 | 0.014 | 0.007 | 0.031 | — | 11.5 | 14.8 | 0.01 | 0.012 | 0.002 | 0.006 | — | 4 | 5.0 | |
| q | 0.027 | 0.33 | 0.76 | 0.013 | 0.012 | 0.029 | — | 2.4 | 9.1 | 0.02 | 0.014 | 0.002 | 0.008 | — | 4 | 1.2 | Flux-Cored |
| r | 0.31 | 0.29 | 0.78 | 0.013 | 0.012 | 0.027 | — | 8.1 | 7.7 | 0.11 | 0.021 | 0.003 | 0.005 | — | 2 | 1.2 | |
| s | 0.102 | 0.20 | 0.83 | 0.015 | 0.006 | 0.025 | — | 1.27 | 0.48 | 0.01 | 0.011 | 0.002 | 0.004 | — | 2 | 1.4 | |
| t | 0.023 | 0.31 | 0.71 | 0.011 | 0.012 | 0.030 | — | 12.1 | 9.2 | 0.19 | 0.021 | 0.003 | 0.004 | — | 3 | 4.0 | |
| u | 0.027 | 0.32 | 0.66 | 0.012 | 0.011 | 0.029 | — | 12.8 | 10.7 | 0.24 | 0.011 | 0.002 | 0.003 | — | 4 | 1.2 | |
| v | 0.024 | 0.29 | 0.69 | 0.011 | 0.009 | 0.029 | — | 11.3 | 11.1 | 0.16 | 0.018 | 0.003 | 0.004 | — | 3 | 1.4 | Flux-Cored |

*ppm

TABLE 9

| | Combination | | | Welding Condition | | | | | | | |
|---|---|---|---|---|---|---|---|---|---|---|---|
| Joint No. | Steel Plate No. | Welding Material No. | Welding Method* | Voltage V | Electric Current A | Welding Rate cm/min | Atmospheric Gas | Heat Input kJ/cm | Number of Stacked Layers | Pre-heating |
| 3-1 | D | h | SMAW | 15 | 220 | 15 | — | 17 | 1 | Not performed |
| 3-2 | E | h | SMAW | 15 | 220 | 15 | — | 17 | 1 | Not performed |
| 3-3 | F | h | SMAW | 15 | 220 | 15 | — | 17 | 1 | Not performed |
| 3-4 | G | h | SMAW | 15 | 220 | 15 | — | 17 | 1 | Not performed |
| 3-5 | D | i | FCW | 15 | 220 | 15 | — | 17 | 1 | Not performed |
| 3-6 | D | j | SMAW | 15 | 220 | 15 | — | 17 | 1 | Not performed |
| 3-7 | D | k | MAG | 15 | 220 | 15 | 80% Ar + 20% $CO_2$ | 17 | 1 | Not performed |
| 3-8 | D | l | SMAW | 15 | 220 | 15 | — | 17 | 1 | Not performed |
| 3-9 | D | m | FCW | 15 | 220 | 15 | — | 17 | 1 | Not performed |
| 3-10 | D | n | MAG | 15 | 220 | 15 | 80% Ar + 20% $CO_2$ | 17 | 1 | Not performed |
| 3-12 | D | p | SMAW | 15 | 220 | 15 | — | 17 | 1 | Not performed |
| 3-13 | D | q | FCW | 15 | 220 | 15 | — | 17 | 1 | Not performed |
| 3-14 | D | r | MAG | 15 | 220 | 15 | 80% Ar + 20% $CO_2$ | 17 | 1 | Not performed |
| 3-15 | D | s | MAG | 15 | 220 | 15 | 80% Ar + 20% $CO_2$ | 17 | 1 | Not performed |
| 3-16 | H | h | SMAW | 15 | 220 | 15 | — | 17 | 1 | Not performed |

TABLE 9-continued

| | Combination | | Welding Condition | | | | | | | |
|---|---|---|---|---|---|---|---|---|---|---|
| Joint No. | Steel Plate No. | Welding Material No. | Welding Method* | Voltage V | Electric Current A | Welding Rate cm/min | Atmospheric Gas | Heat Input kJ/cm | Number of Stacked Layers | Pre-heating |
| 3-17 | H | i | FCW | 15 | 220 | 15 | — | 17 | 1 | Not performed |
| 3-18 | D | t | SMAW | 15 | 220 | 15 | — | 17 | 1 | Not performed |
| 3-19 | E | t | SMAW | 15 | 220 | 15 | — | 17 | 1 | Not performed |
| 3-20 | D | u | MAG | 15 | 220 | 15 | 80% Ar + 20% $CO_2$ | 17 | 1 | Not performed |
| 3-21 | D | v | SMAW | 15 | 220 | 15 | — | 17 | 1 | Not performed |

*SMAW: Shielded Metal Arc Welding
FCW: Flux-Cored Wire
MAG: Gas Metal Arc Welding (Metal Active Gas Welding)

TABLE 10

| | Combination | | Chemical Compositions (mass %) | | | | | | | M Value of Formula (2)* | Satisfies or not Formula (3) | Satisfies or not Formula (3) |
|---|---|---|---|---|---|---|---|---|---|---|---|---|
| Joint No. | Steel Plate No. | Welding Material No. | C | Si | Mn | Ni | Cr | Mo | Nb | | | |
| 3-1 | D | h | 0.070 | 0.33 | 0.74 | 9.30 | 9.30 | 0.12 | 0.003 | 172 | ○ | X |
| 3-2 | E | h | 0.068 | 0.32 | 0.71 | 9.39 | 9.33 | 0.16 | 0.003 | 170 | ○ | X |
| 3-3 | F | h | 0.051 | 0.31 | 0.65 | 9.30 | 9.30 | 0.12 | 0.003 | 189 | ○ | X |
| 3-4 | G | h | 0.051 | 0.31 | 0.65 | 9.30 | 9.30 | 0.12 | 0.003 | 189 | ○ | X |
| 3-5 | D | i | 0.064 | 0.26 | 0.75 | 3.78 | 11.61 | 0.01 | 0.003 | 273 | ○ | X |
| 3-6 | D | j | 0.063 | 0.22 | 0.91 | 11.90 | 3.63 | 0.02 | 0.004 | 246 | ○ | X |
| 3-7 | D | k | 0.084 | 0.26 | 0.93 | 7.02 | 10.35 | 0.47 | 0.005 | 188 | ○ | X |
| 3-8 | D | l | 0.072 | 0.33 | 0.82 | 6.42 | 11.91 | 0.14 | 0.031 | 184 | ○ | X |
| 3-9 | D | m | 0.060 | 0.25 | 0.77 | 8.01 | 9.72 | 0.16 | 0.004 | 206 | ○ | X |
| 3-10 | D | n | 0.070 | 0.22 | 0.86 | 11.61 | 11.43 | 0.12 | 0.003 | 62 | ○ | ○ |
| 3-12 | D | p | 0.076 | 0.33 | 0.87 | 10.70 | 13.77 | 0.01 | 0.002 | 26 | X | X |
| 3-13 | D | q | 0.080 | 0.32 | 0.82 | 2.16 | 8.19 | 0.02 | 0.002 | 381 | X | X |
| 3-14 | D | r | 0.320 | 0.29 | 0.83 | 7.29 | 8.82 | 0.10 | 0.003 | 38 | X | X |
| 3-15 | D | s | 0.228 | 0.21 | 0.88 | 1.14 | 0.43 | 0.01 | 0.004 | 478 | X | X |
| 3-16 | H | h | 0.069 | 0.31 | 0.73 | 9.31 | 9.31 | 0.12 | 0.002 | 173 | ○ | X |
| 3-17 | H | i | 0.064 | 0.24 | 0.74 | 3.75 | 11.59 | 0.01 | 0.003 | 275 | ○ | X |
| 3-18 | D | t | 0.068 | 0.32 | 0.75 | 11.8 | 8.4 | 0.16 | 0.003 | 129 | ○ | ○ |
| 3-19 | E | t | 0.068 | 0.30 | 0.72 | 12.4 | 7.6 | 0.11 | 0.002 | 133 | ○ | ○ |
| 3-20 | D | u | 0.066 | 0.31 | 0.74 | 12.4 | 10.3 | 0.18 | 0.002 | 69 | ○ | ○ |
| 3-21 | D | v | 0.065 | 0.31 | 0.74 | 11.4 | 10.4 | 0.13 | 0.003 | 96 | ○ | ○ |

| | | | Weld Cracking (%)** | | | | | | |
|---|---|---|---|---|---|---|---|---|---|
| | Ms point | Amount of Linear | Condition ① | | | Condition ② | | | |
| Joint No. | temperature °C. | Expansion mm/mm $10^{-3}$ | Surface Cracking | Section Cracking | Root Cracking | Surface Cracking | Section Cracking | Root Cracking | Note |
| 3-1 | 180 | 4.8 | 0 | 5 | 17 | 0 | 0 | 0 | Example of the present Invention |
| 3-2 | 179 | 4.7 | 0 | 6 | 22 | 0 | 0 | 0 | Example of the present Invention |
| 3-3 | 180 | 5.1 | 0 | 8 | 17 | 0 | 0 | 0 | Example of the present Invention |
| 3-4 | 179 | 5.0 | 0 | 7 | 22 | 0 | 0 | 0 | Example of the present Invention |
| 3-5 | 281 | 2.1 | 0 | 11 | 61 | 0 | 0 | 0 | Example of the present Invention |
| 3-6 | 251 | 2.2 | 0 | 14 | 39 | 0 | 0 | 0 | Example of the present Invention |
| 3-7 | 196 | 4.8 | 0 | 3 | 17 | 0 | 0 | 0 | Example of the present Invention |
| 3-8 | 188 | 5.0 | 0 | 4 | 17 | 0 | 0 | 0 | Example of the present Invention |
| 3-9 | 211 | 4.5 | 0 | 11 | 17 | 0 | 0 | 0 | Example of the present Invention |
| 3-10 | 66 | 4.1 | 0 | 0 | 0 | 0 | 0 | 0 | Example of the present Invention |

TABLE 10-continued

| | | | | | | | | | |
|---|---|---|---|---|---|---|---|---|---|
| 3-12 | 30 | 0.9 | — | — | — | 16 | 33 | 24 | Comparative Example |
| 3-13 | 394 | 1.2 | — | — | — | 32 | 67 | 41 | Comparative Example |
| 3-14 | 41 | 1.6 | — | — | — | 0 | 11 | 7 | Comparative Example |
| 3-15 | 489 | −2.1 | — | — | — | 51 | 100 | 73 | Comparative Example |
| 3-16 | 178 | 2.3 | 0 | 4 | 22 | 0 | 0 | 0 | Example of the present Invention |
| 3-17 | 280 | 2.2 | 0 | 14 | 39 | 0 | 0 | 0 | Example of the present Invention |
| 3-18 | 137 | 7.1 | 0 | 0 | 0 | 0 | 0 | 0 | Example of the present Invention |
| 3-19 | 141 | 6.8 | 0 | 0 | 0 | 0 | 0 | 0 | Example of the present Invention |
| 3-20 | 77 | 5.9 | 0 | 0 | 0 | 0 | 0 | 0 | Example of the present Invention |
| 3-21 | 102 | 5.8 | 0 | 0 | 0 | 0 | 0 | 0 | Example of the present Invention |

*M = 719-795C—35.55Si—13.25Mn—23.7Cr—26.5Ni—23.7Mo—11.85Nb
**Average of three Joints

TABLE 11

| | | Combination | | | Welding Condition | | | | | | |
|---|---|---|---|---|---|---|---|---|---|---|---|
| Joint No. | Type of Joint | Steel Plate No. | Welding Material No. | Welding Method* | Voltage V | Electric Current A | Welding Rate cm/min | Atmospheric Gas | Heat Input kJ/cm | Number of Stacked Layers | Pre-heating |
| 4-1 | Butt | D | h | SMAW | 20 | 210 | 10 | — | 43 | 1 | Not performed |
| | | | | | 20 | 210 | 11 | — | 38 | Final Layer | Not performed |
| 4-2 | Cruciform | D | k | MAG | 33 | 240 | 60 | 80% Ar + 20% $CO_2$ | 8 | 1 | Not performed |
| | | | | | 33 | 240 | 60 | 80% Ar + 20% $CO_2$ | 8 | 2 | Not performed |
| 4-3 | Butt | D | t | SMAW | 20 | 210 | 10 | — | 43 | 1 | Not performed |
| | | | | | 20 | 210 | 11 | — | 38 | Final Layer | Not performed |
| 4-4 | Cruciform | D | t | SMAW | 20 | 210 | 10 | — | 43 | 1 | Not performed |

*SMAW: Shielded Arc Welding
MAG: Gas Metal Arc Welding (Metal Active Gas Welding)

TABLE 12

| | Combination | | Position of the stacked Layer | Chemical Compostions (mass %) | | | | | | | M value of Formula (2)* | Satisfies or not Formula (2) | Satisfies or not Formula (3) | Ms point temperature ° C. | Presence/ Absence of Weld-cracking | Note |
|---|---|---|---|---|---|---|---|---|---|---|---|---|---|---|---|---|
| Joint No. | Steel Plate No. | Welding Material No. | | C | Si | Mn | Ni | Cr | Mo | Nb | | | | | | |
| 4-1 | D | h | First Layer | 0.071 | 0.32 | 0.74 | 9.21 | 9.24 | 0.11 | 0.002 | 176 | ○ | X | 190 | None | Example of the present Invention |
| | | | Final Layer | 0.060 | 0.33 | 0.72 | 9.70 | 9.03 | 0.12 | 0.001 | 162 | ○ | ○ | 173 | None | |
| 4-2 | D | k | 1 | 0.080 | 0.24 | 0.90 | 6.99 | 10.11 | 0.45 | 0.003 | 199 | ○ | X | 208 | None | Example of the present Invention |
| 4-3 | D | t | First Layer | 0.067 | 0.32 | 0.74 | 11.5 | 8.2 | 0.16 | 0.002 | 142 | ○ | ○ | 148 | None | Example of the present Invention |
| | | | Final Layer | 0.066 | 0.32 | 0.72 | 11.9 | 8.8 | 0.14 | 0.002 | 117 | ○ | ○ | 125 | None | |

TABLE 12-continued

| Joint No. | Combination Steel Plate No. | Welding Material No. | Position of the stacked Layer | Chemical Compostions (mass %) | | | | | | | M value of Formula (2)* | Satisfies or not Formula (2) | Satisfies or not Formula (3) | Ms point temperature ° C. | Presence/ Absence of Weld- cracking | Note |
|---|---|---|---|---|---|---|---|---|---|---|---|---|---|---|---|---|
| | | | | C | Si | Mn | Ni | Cr | Mo | Nb | | | | | | |
| 4-4 | D | t | 1 | 0.064 | 0.31 | 0.74 | 11.3 | 8.3 | 0.13 | 0.002 | 149 | ○ | ○ | 156 | None | Example of the present Invention |

INDUSTRIAL APPLICABILITY OF THE PRESENT INVENTION

In the present invention, when a high-tensile strength steel material of 490-980 MPa grade is welded, occurrence of low-temperature-cracking can be prevented without conducting pre-heating. Accordingly, the work efficiency during the welding operation is improved and significant effect are achieved in industrial applications. In addition, the weld metal of the present invention is excellent in the fatigue resistance properties and suppresses abnormal increase in strength of the weld metal. Further, concentration of stress on the weld metal can be prevented, thereby achieving an effect of enhancing the formability of the steel structures.

The invention claimed is:

1. A method of welding with an iron-based alloy welding material comprising welding a low-alloy steel material having a tensile strength of 490 to 1180 MPa with the iron-based alloy welding material, the welding material having a composition comprising, by mass %:
less than 0.05% of C;
from 6.0 to 16.0% of Cr; and
from 6.0 to 16.0% of Ni,
wherein, the martensitic transformation starting temperature (Ms point) is at least 0° C. and less than 170° C., and
wherein the composition of the welding material is adjusted so that the contents of C, Si, Mn, Cr, Ni, Mo, and Nb satisfy the following formula (1):

$$0 \leq 719-795C-35.55Si-13.25Mn-23.7Cr-26.5Ni-23.7Mo-11.85Nb < 170 \quad (1)$$

wherein C, Si, Mn, Cr, Ni, Mo, and Nb represent the contents of the respective elements (mass %).

2. A method of welding with an iron-based alloy welding material comprising welding a low-alloy steel material having a tensile strength of 490 to 1180 MPa with the iron-based alloy welding material, the welding material having a composition comprising, by mass %:
less than 0.05% of C;
from 6.0 to 16.0% of Cr; and
from 6.0 to 16.0% of Ni,
wherein, the martensitic transformation starting temperature (Ms point) is at least 0° C. and less than 170° C.,
wherein the composition of the welding material is adjusted so that the contents of C, Si, Mn, Cr, Ni, Mo, and Nb satisfy the following formula (1):

$$0 \leq 719-795C-35.55Si-13.25Mn-23.7Cr-26.5Ni-23.7Mo-11.85Nb < 170 \quad (1)$$

wherein C, Si, Mn, Cr, Ni, Mo, and Nb represent the contents of the respective elements (mass %), and
wherein the composition of the welding material further contains at most 1.0% of Si and at most 2.5% of Mn or further contains either or both of at most 4.0% of Mo and at most 1.0% of Nb, and balance Fe and inevitable impurities.

3. A method of producing a welded joint, in which materials to be welded are welded to each other using a welding material so as to form a welded joint, comprising the steps of:
employing a low alloy steel material as a material to be welded;
forming a weld metal by welding; and
adjusting composition and welding conditions of the welding material, according to the composition of the material to be welded, such that the weld metal is an iron alloy composition containing at most about 0.20 mass % of C, from about 3.0 to about 13.0 mass % of Cr, from about 3.0 to about 13.0 mass % of Ni and has a martensitic transformation starting temperature in about a range from about 50° C. to less than 170° C.,
wherein the weld metal is adjusted such that C, Si, Mn, Cr, Ni, Mo, Nb contents thereof satisfies a following formula (3):

$$50 \leq 719-795C-35.55Si-13.25Mn-23.7Cr-26.5Ni-23.7Mo-11.85Nb < 170 \quad (3)$$

wherein C, Si, Mn, Cr, Ni, Mo, Nb represent the content of each element (mass %), respectively.

4. A method of producing a welded joint, in which materials to be welded are welded to each other using a welding material so as to form a welded joint, comprising the steps of:
employing a low alloy steel material as a material to be welded;
forming a weld metal by welding; and
adjusting composition and welding conditions of the welding material, according to the composition of the material to be welded, such that the weld metal is an iron alloy composition containing at most about 0.20 mass % of C, from about 3.0 to about 13.0 mass % of Cr, from about 3.0 to about 13.0 mass % of Ni and has a martensitic transformation starting temperature in about a range from about 50° C. to less than 170° C., wherein the welding is multi-layered welding, and wherein the composition of the weld metal, formed by first-layer welding or further by final-layer welding of the multi-layer welding, satisfies a following formula (3):

$$50 \leq 719-795C-35.55Si-13.25Mn-23.7Cr-26.5Ni-23.7Mo-11.85Nb < 170 \quad (3)$$

wherein C, Si, Mn, Cr, Ni, Mo, Nb represent the content of each element (mass %), respectively.

* * * * *